US012198279B2

United States Patent
Jang et al.

(10) Patent No.: US 12,198,279 B2
(45) Date of Patent: Jan. 14, 2025

(54) APPARATUS AND METHOD FOR PROVIDING SPLIT-RENDERED VIRTUAL REALITY IMAGE

(71) Applicant: KOREA ELECTRONICS TECHNOLOGY INSTITUTE, Seongnam-si (KR)

(72) Inventors: Junhwan Jang, Goyang-si (KR); Woochool Park, Incheon (KR); Jinwook Yang, Uijeongbu-si (KR); Minsu Choi, Seoul (KR); Junsuk Lee, Seoul (KR); Bonjae Koo, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 113 days.

(21) Appl. No.: 18/056,144

(22) Filed: Nov. 16, 2022

(65) Prior Publication Data

US 2023/0084960 A1   Mar. 16, 2023

Related U.S. Application Data

(63) Continuation of application No. PCT/KR2020/015702, filed on Nov. 10, 2020.

(30) Foreign Application Priority Data

Oct. 14, 2020   (KR) .................... 10-2020-0132648

(51) Int. Cl.
*G06T 19/00* (2011.01)
*H04N 13/167* (2018.01)
*H04N 13/194* (2018.01)

(52) U.S. Cl.
CPC ........ *G06T 19/006* (2013.01); *G06T 2210/32* (2013.01)

(58) Field of Classification Search
CPC ... G06T 19/006; G06T 2210/32; G06T 15/20; G06T 2219/024; G06T 19/00;
(Continued)

(56) References Cited

U.S. PATENT DOCUMENTS

2017/0004648 A1   1/2017 Li
2017/0244951 A1*  8/2017 Ha .................... G09G 5/363

FOREIGN PATENT DOCUMENTS

KR   10-2016-0125708 A   11/2016
KR   10-2018-0119238 A   11/2018
(Continued)

OTHER PUBLICATIONS

International Search Report mailed Jul. 27, 2021 in International Application No. PCT/KR2020/015702.
(Continued)

*Primary Examiner* — Sing-Wai Wu
(74) *Attorney, Agent, or Firm* — Knobbe, Martens, Olson, & Bear, LLP

(57) ABSTRACT

An edge server for providing a virtual reality (VR) image is proposed. The server may include a rendering synchronization unit synchronizing a visual field and a margin with a virtual reality device. The server may also include a rendering unit generating a rendered image by rendering a visual field area corresponding to the visual field and a margin area corresponding to the margin based on a rotation center in an entire virtual reality image. The server may further include an encoding unit generating a reduced margin area by dividing a resolution of the margin area by a scaling factor, and encoding the visual field area and the reduced margin area to generate a split virtual reality image including the encoded visual field area and the encoded reduced margin
(Continued)

area. The server may further include a streaming transmission unit transmitting the split virtual reality image to the virtual reality device.

12 Claims, 10 Drawing Sheets

(58) Field of Classification Search
CPC .. H04N 13/161; H04N 13/167; H04N 13/189; H04N 13/194; H04N 21/81
See application file for complete search history.

(56) References Cited

FOREIGN PATENT DOCUMENTS

| KR | 10-2019-0063590 A | 6/2019 |
|---|---|---|
| KR | 10-2023905 B1 | 11/2019 |
| KR | 10-2020-060900 A | 6/2020 |

OTHER PUBLICATIONS

Office Action dated Jul. 19, 2021 in Korean Application No. 10-2020-0132648.

\* cited by examiner

FIG. 7
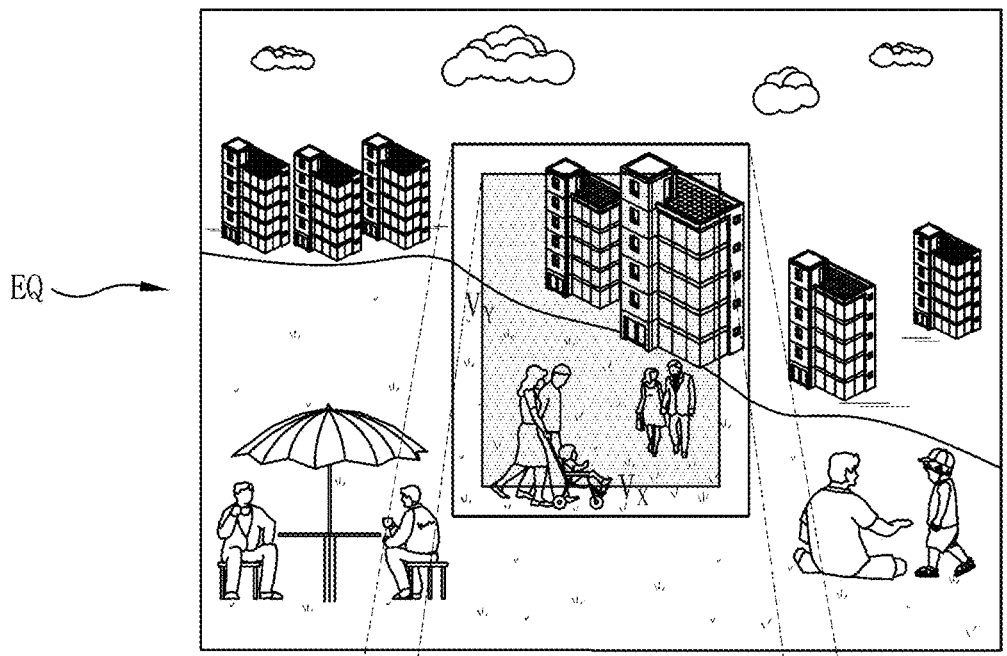
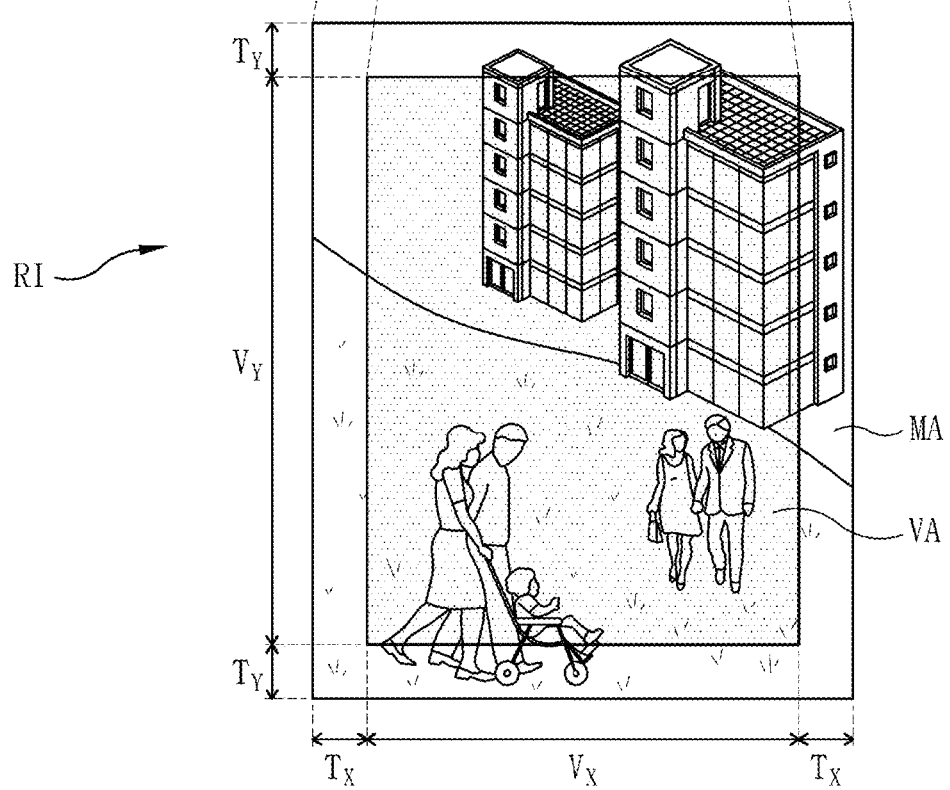

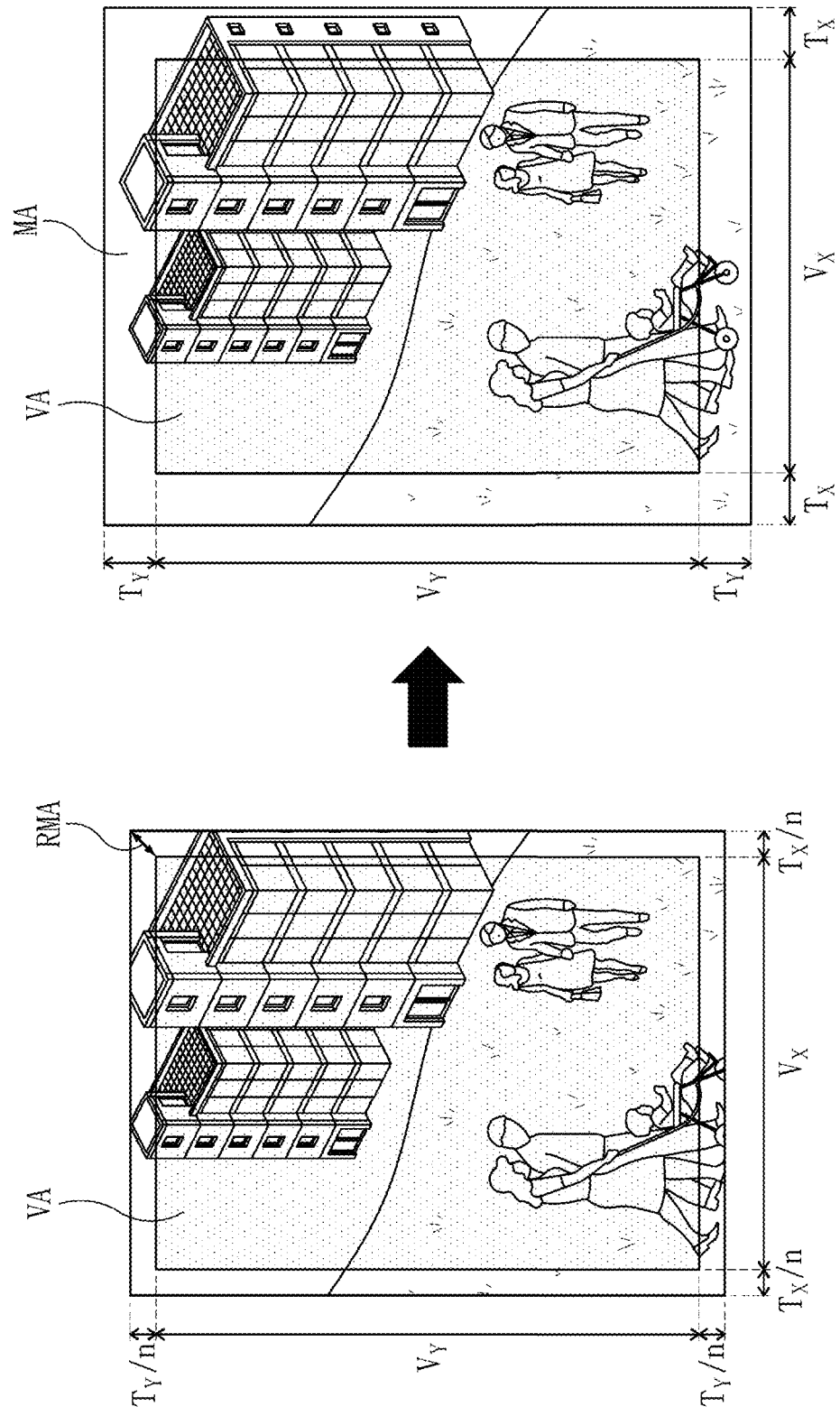

APPARATUS AND METHOD FOR PROVIDING SPLIT-RENDERED VIRTUAL REALITY IMAGE

CROSS REFERENCE TO RELATED APPLICATIONS

This is a continuation application of International Patent Application No. PCT/KR2020/015702, filed on Nov. 10, 2020, which claims priority to Korean patent application No. KR 10-2020-0132648 filed on Oct. 14, 2020, contents of both of which are incorporated herein by reference in their entireties.

BACKGROUND

Technical Field

The present disclosure relates to a technology for providing a virtual reality image, and more particularly, to an apparatus and method for providing the entire virtual reality image, that is, a 360-degree equirectangular image, through split rendering.

Description of Related Technology

Virtual reality (VR) refers to a specific environment or situation, or technology itself, which is created by artificial technology using a computer to be similar to the real but not real. The created virtual environment or situation stimulates the user's five senses and allows the user to freely enter and exit the boundary between reality and imagination by giving a spatial and temporal experience similar to the real one.

SUMMARY

The present disclosure is intended to provide an apparatus and method for providing a split-rendered virtual reality image.

According to an embodiment of the present disclosure, an edge server for providing a virtual reality (VR) image may include a rendering synchronization unit synchronizing a visual field and a margin with a virtual reality device, a rendering unit generating a rendered image by rendering a visual field area corresponding to the visual field and a margin area corresponding to the margin based on a rotation center in an entire virtual reality image, an encoding unit generating a reduced margin area by dividing a resolution of the margin area by a scaling factor, and encoding the visual field area and the reduced margin area to generate a split virtual reality image including the encoded visual field area and the encoded reduced margin area, and a streaming transmission unit transmitting the split virtual reality image to the virtual reality device.

The margin area may be divided into a plurality of sections, and the scale factor of each of the plurality of sections may have a relatively large value as a distance from the visual field area increases.

The streaming transmission unit may mux (or multiplex) a common media application format (CMAF) live profile to the split virtual reality image, and split-encode the split virtual reality image in units of chunks according to the CMAF to transmit the split virtual reality image.

According to an embodiment of the present disclosure, a virtual reality device for providing a virtual reality (VR) image may include a reproduction synchronization unit synchronizing a visual field and a margin with an edge server, a decoding unit decoding a visual field area and a reduced margin area according to the visual field and the margin upon receiving a split virtual reality image from the edge server, and enlarging the reduced margin area according to a scaling factor to derive the split virtual reality image including the visual field and the margin area, and a reproduction unit reproducing the derived split virtual reality image.

The decoding unit may store the split virtual reality image including the visual field area and the margin area in a decoding buffer, and the reproduction unit may derive a reproduction area through a view window from the split virtual reality image stored in the buffer, and reproduces the derived reproduction area.

The margin area may be divided into a plurality of sections, and the scale factor of each of the plurality of sections may have a relatively large value as a distance from the visual field area increases.

According to an embodiment of the present disclosure, a method for providing a virtual reality (VR) image at an edge server may include, at a rendering synchronization unit, synchronizing a visual field and a margin with a virtual reality device, at a rendering unit, generating a rendered image by rendering a visual field area corresponding to the visual field and a margin area corresponding to the margin based on a rotation center in an entire virtual reality image, at an encoding unit, generating a reduced margin area by dividing a resolution of the margin area by a scaling factor, and encoding the visual field area and the reduced margin area to generate a split virtual reality image including the encoded visual field area and the encoded reduced margin area, and at a streaming transmission unit, transmitting the split virtual reality image to the virtual reality device.

According to an embodiment of the present disclosure, a method for providing a virtual reality (VR) image at a virtual reality device may include, at a reproduction synchronization unit (or reproduction synchronization processor), synchronizing a visual field and a margin with an edge server, at a decoding unit (or a decoder), decoding a visual field area and a reduced margin area according to the visual field and the margin upon receiving a split virtual reality image from the edge server, and enlarging the reduced margin area according to a scaling factor to derive the split virtual reality image including the visual field and the margin area, and at a reproduction unit (or a reproduction processor), reproducing the derived split virtual reality image.

According to the present disclosure, it is possible to provide a virtual reality image within a user's visual field through streaming and thereby allow a high-quality virtual reality image to be streamed regardless of the performance of a user's virtual reality device.

BRIEF DESCRIPTION OF THE DRAWINGS

FIGS. 5 to 12C are screen examples illustrating a method for providing a split-rendered virtual reality image according to an embodiment of the present disclosure.

DETAILED DESCRIPTION

Figure 1:
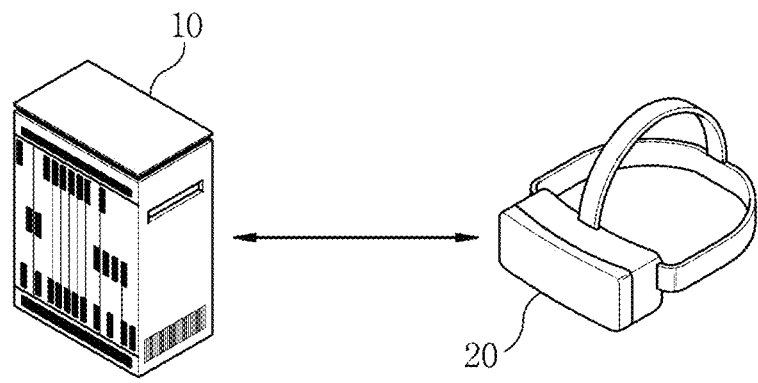
FIG. 1 is a diagram illustrating the configuration of a system for providing a virtual reality image according to an embodiment of the present disclosure.

Terms used herein should not be construed as being limited to their usual or dictionary meanings. In view of the fact that the inventor can appropriately define the meanings of terms in order to describe his/her own invention in the best way, the terms should be interpreted as meanings consistent with the technical idea of the present disclosure. In addition, the following description and corresponding drawings merely relate to specific embodiments of the present disclosure and do not represent all the subject matter of the present disclosure. Therefore, it will be understood that there are various equivalents and modifications of the disclosed embodiments at the time of the present application.

Now, embodiments of the present disclosure will be described in detail with reference to the accompanying drawings. In the drawings, like elements are denoted by the same reference numerals. In addition, detailed descriptions of well-known functions and elements that may obscure the subject matter of the present disclosure will be omitted. For the same reason, some elements are exaggerated, omitted, or schematically illustrated in the drawings, and the size of each element does not fully reflect the actual size.

First, a system for providing a virtual reality (VR) image according to an embodiment of the present disclosure will be described. FIG. 1 is a diagram illustrating the configuration of a system for providing a virtual reality image according to an embodiment of the present disclosure.

Referring to FIG. 1, a system for providing a virtual reality image according to an embodiment of the present disclosure includes an edge server 10 and a virtual reality device 20. The edge server 10 and the virtual reality device 20 are connected through wireless communication.

The edge server 10 may be an edge cloud server located closest to the virtual reality device 20 or a high-performance PC connected to the virtual reality device 20 by Wi-Fi or the like.

The virtual reality device 20 may be any device capable of reproducing virtual reality. Representatively, the virtual reality device 20 may be a head mounted display (HMD).

According to the present disclosure, the edge server 10 is capable of rendering virtual reality images and providing them to the virtual reality device 20 through real-time streaming, and the virtual reality device 20 is capable of reproducing the virtual reality images received through real-time streaming. Therefore, it is possible to provide high-quality virtual reality images regardless of the performance of the virtual reality device 20.

Figure 2:
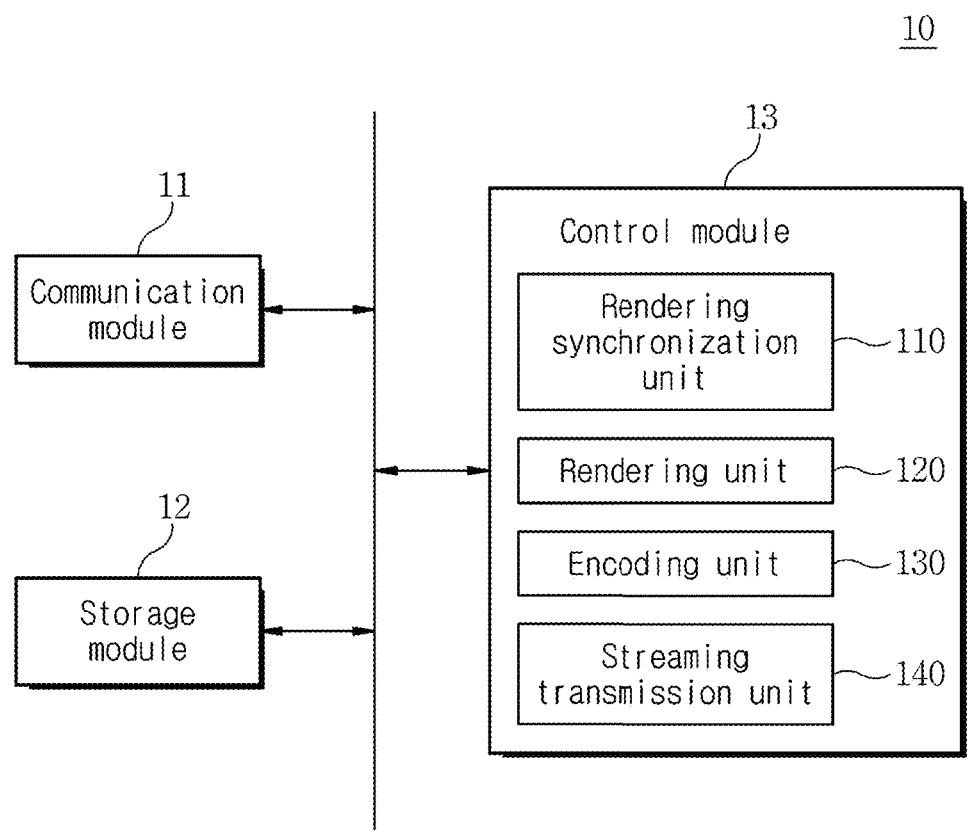
FIG. 2 is a diagram illustrating the configuration of an edge server for providing a virtual reality image according to an embodiment of the present disclosure.

Next, the edge server 10 for providing a virtual reality image according to an embodiment of the present disclosure will be described. FIG. 2 is a diagram illustrating the configuration of an edge server for providing a virtual reality image according to an embodiment of the present disclosure. Referring to FIG. 2, the edge server 10 according to an embodiment of the present disclosure includes a communication module 11, a storage module 12, and a control module 13.

The communication module 11 is for communicating with the virtual reality device 20 through a network. The communication module 11 may transmit/receive data to/from the virtual reality device 20. The communication module 11 may include a radio frequency (RF) transmitter (Tx) for up-converting the frequency of a signal to be transmitted and amplifying the signal, and an RF receiver (Rx) for low-noise amplifying a received signal and down-converting the frequency of the signal. Also, in order to transmit/receive data, the communication module 11 may include a modem for modulating a signal to be transmitted and demodulating a received signal. The communication module 11 may transmit data received from the control module 13 to the virtual reality device 20. Also, the communication module 11 may deliver data received from the virtual reality device 20 to the control module 13.

The storage module 12 stores programs and data necessary for the operation of the edge server 10. For example, the storage module 12 may store virtual reality image contents. In addition, the storage module 12 may store the visual field and margin of the virtual reality device 20. A scale factor of each of a plurality of layers of the margin may also be stored. Various data stored in the storage module 121 may be registered, deleted, changed, or added according to a manipulation of an administrator of the edge server 10.

The control module 13 may control the overall operation of the edge server 10 and a signal flow between internal blocks of the edge server 10, and may perform a data processing function. The control module 13 may be a central processing unit, a digital signal processor, or the like. In addition, the control module 13 may further include an image processor or a graphic processing unit (GPU). The control module 13 includes a rendering synchronization unit (or a rendering synchronization processor) 110, a rendering unit (or a rendering processor) 120, an encoding unit (or an encoder) 130, and a streaming transmission unit (or a streaming transmitter) 140. The operation of the control module 13 will be described in more detail below.

Figure 3:
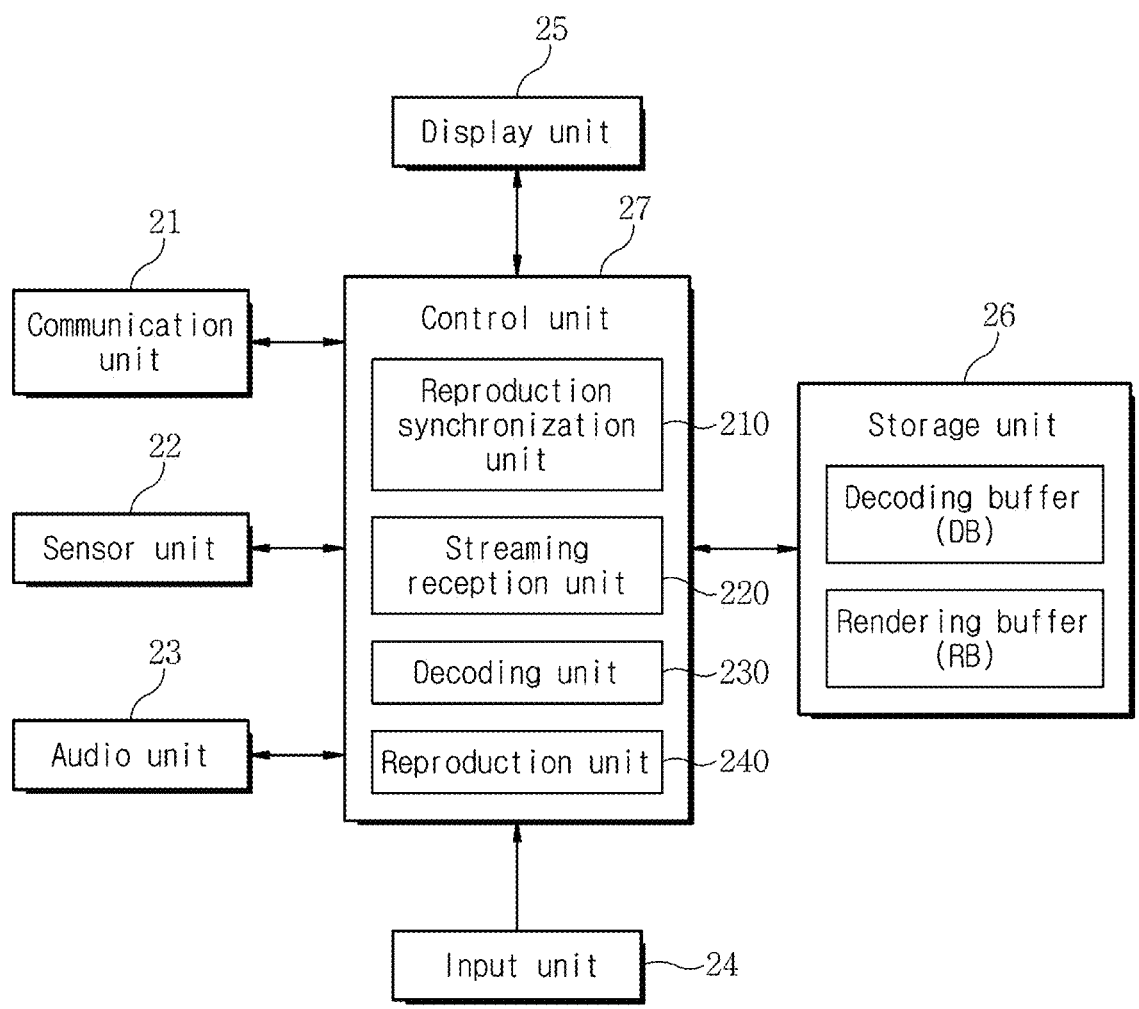
FIG. 3 is a diagram illustrating the configuration of a virtual reality device for providing a virtual reality image according to an embodiment of the present disclosure.

Next, the virtual reality device 20 for providing a virtual reality image according to an embodiment of the present disclosure will be described. FIG. 3 is a diagram illustrating the configuration of a virtual reality device for providing a virtual reality image according to an embodiment of the present disclosure. Referring to FIG. 3, the virtual reality device 20 according to an embodiment of the present disclosure includes a communication unit 21, a sensor unit 22, an audio unit 23, an input unit 24, a display unit 25, and a storage unit 26, and a control unit 27.

The communication unit 21 is for communication with the edge server 10. The communication unit 21 may include a radio frequency (RF) transmitter (Tx) for up-converting the frequency of a signal to be transmitted and amplifying the signal, and an RF receiver (Rx) for low-noise amplifying a received signal and down-converting the frequency of the signal. In addition, the communication unit 21 may include a modem that modulates a signal to be transmitted and demodulates a received signal.

The sensor unit 22 is for measuring inertia. The sensor unit 12 includes an inertial measurement unit (IMU), a Doppler velocity log (DVL), an attitude and heading reference system (AHRS), and the like. The sensor unit 22 measures inertial information including the position and speed of rotation and movement of the virtual reality device 20 and provides the measured inertial information of the virtual reality device 20 to the control unit 27.

The audio unit 23 includes a speaker (SPK) for outputting an audio signal, and a microphone (MIKE) for receiving an audio signal. The audio unit 23 may output an audio signal through the speaker under the control of the control unit 27, or deliver an audio signal inputted through the microphone to the control unit 27. In particular, the audio unit 23 outputs an audio signal of a virtual reality image.

The input unit 24 receives a user's key manipulation for controlling the virtual reality device 20, generates an input signal, and delivers the generated input signal to the control unit 27. The input unit 24 may include various keys for controlling the virtual reality device 20. Some of the functions of the input unit 24 may be formed in a touch screen.

The display unit 25 visually provides a menu of the virtual reality device 20, input data, function setting information, and various other kinds of information to a user. The display unit 25 performs a function of outputting a booting screen, an idle screen, a menu screen, and the like of the virtual reality device 20. In particular, the display unit 25 performs a function of outputting a virtual reality image according to an embodiment of the present disclosure to the screen. The display unit 25 may be formed of a liquid crystal display (LCD), an organic light emitting diode (OLED), an active matrix OLED (AMOLED), or the like.

The storage unit 26 stores programs and data necessary for the operation of the virtual reality device 20. In particular, the storage unit 26 includes a decoding buffer (DB) for temporarily storing a virtual reality image, a split virtual reality image, and the like, and a rendering buffer (RB) for temporarily storing a reproduction area. Also, the storage unit 26 may store various parameters such as a visual field, a margin, and a scaling factor of a margin area. Various data stored in the storage unit 26 may be deleted, changed, or added according to a manipulation of a user of the virtual reality device 20.

The control unit 27 may control the overall operation of the virtual reality device 20 and a signal flow between internal blocks of the virtual reality device 20, and perform a data processing function. Also, the control unit 27 basically controls various functions of the virtual reality device 20. The control unit 27 may include a central processing unit (CPU), a baseband processor (BP), an application processor (AP), a graphic processing unit (GPU), a digital signal processor (DSP), or the like. The operation of the control unit 27 will be described in more detail below.

Figure 4:
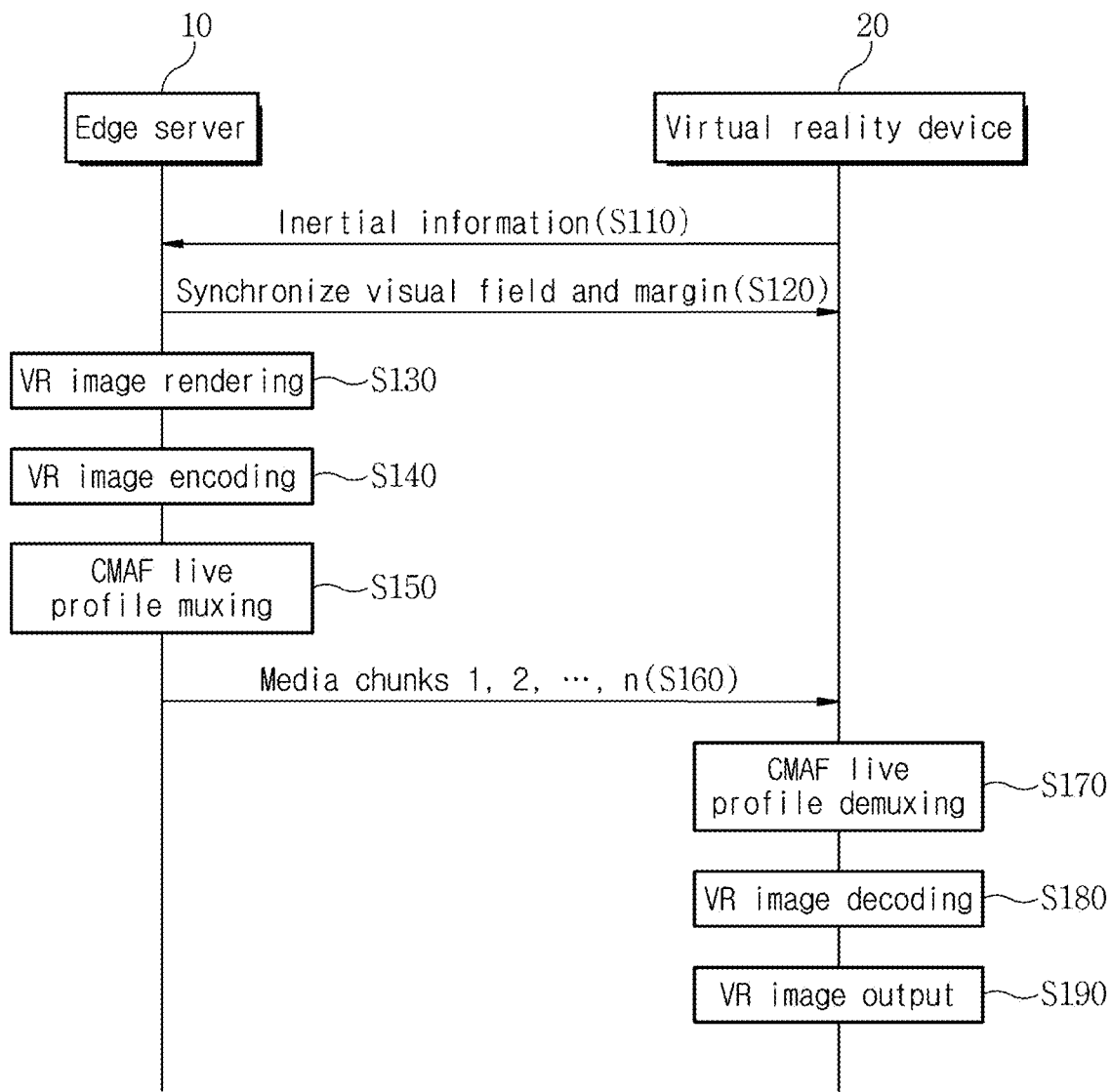
FIG. 4 is a flowchart illustrating a method for providing a split-rendered virtual reality image according to an embodiment of the present disclosure.

Next, a method for providing a split-rendered virtual reality image according to an embodiment of the present disclosure will be described. FIG. 4 is a flowchart illustrating a method for providing a split-rendered virtual reality image according to an embodiment of the present disclosure. FIGS. 5 to 12 are screen examples illustrating a method for providing a split-rendered virtual reality image according to an embodiment of the present disclosure.

Referring to FIG. 4, at step S110, the reproduction synchronization unit 210 of the virtual reality device 20 derives information related to the movement of the virtual reality device 20 through the sensor unit 22, representatively, inertial information including the rotation center (RC) of the virtual reality device 20 and the position and speed of the rotation center (RC) being moved, and transmits the derived inertial information to the edge server 10 through the communication unit 21. Providing the inertia information at then step S110 is continuously made. Accordingly, at step S120, the edge server 10 and the virtual reality device 20 may synchronize a visual field (VF) and a margin (M). To this end, the rendering synchronization unit 110 of the edge server 10 derives the visual field (VF) and the margin (M) of the virtual reality device 20 based on the inertia information. Here, the visual field (VF) of the virtual reality device 20 or the user is derived from the inertia information. The margin (M) is derived in consideration of the visual field (VF) of the user and the user's viewpoint moving speed derived from the inertial information. Meanwhile, the margin (M) may be changed according to a user's behavior pattern or network environment derived from the inertia information continuously received. Subsequently, the rendering synchronization unit 110 transmits the derived visual field (VF) and margin (M) to the virtual reality device 20 through the communication module 11. Then, the reproduction synchronization unit 210 of the virtual reality device 20 receives the visual field (VF) and the margin (M) through the communication unit 21, and stores the received visual field (VF) and margin (M) in the storage unit 26. As such, the edge server 10 and the virtual reality device 20 can synchronize the visual field (VF) and the margin (M).

Figure 5:
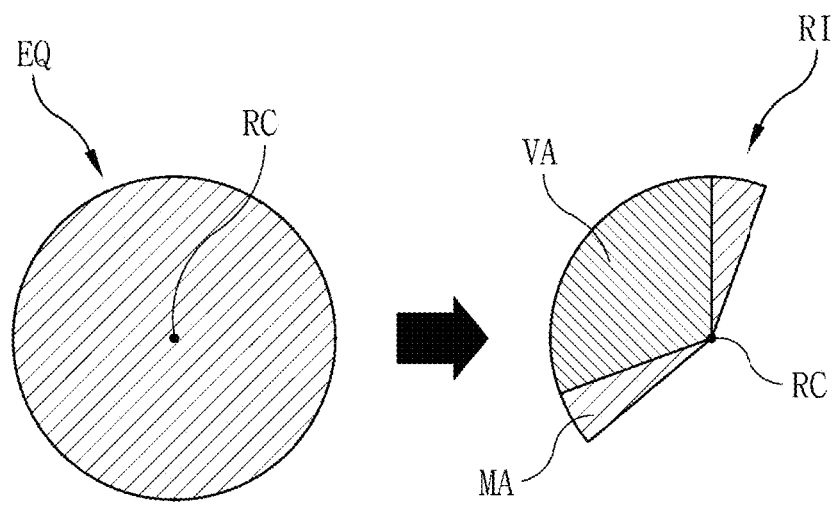
Figure 6:
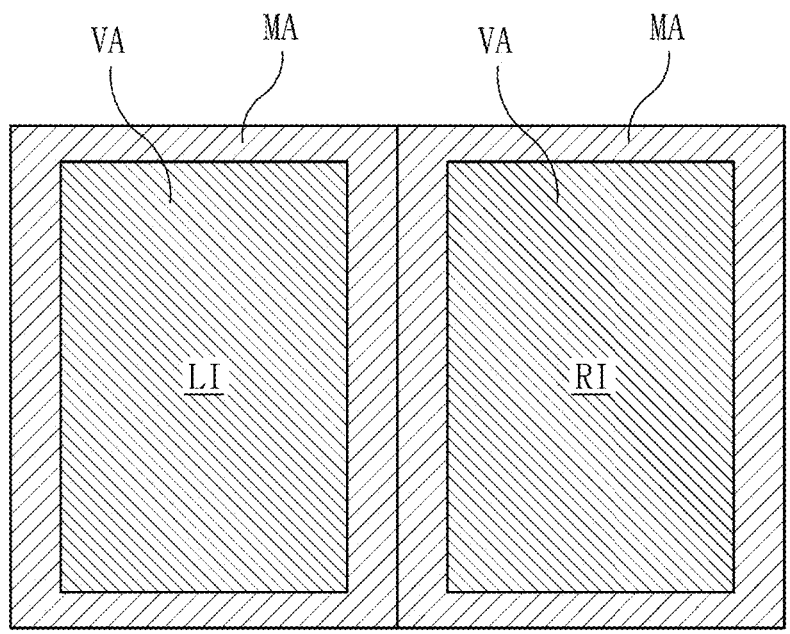

Then, at step S130, the rendering unit 120 of the edge server 10 generates a rendered image as shown in FIG. 5 by rendering a visual field area (VA) corresponding to the visual field (VF) and a margin area (MA) corresponding to the margin (M) based on the rotation center (RC) in the entire virtual reality image (EQ), that is, in the 360-degree equirectangular image. As shown in FIG. 6, to provide a stereoscopic image, the rendered image includes a left image (LI) and a right image (RI), each of which includes the visual field area (VA) and the margin area (MA).

As shown in FIG. 7, the visual field area (VA) derived from the visual field (VF) in the entire virtual reality image (EQ) has a size of Vx×Vy. An area extending outward (up, down, left and right) by the margins (M) Tx and Ty from the edges of the visual field area (VA) is the margin area (MA).

Figure 8:
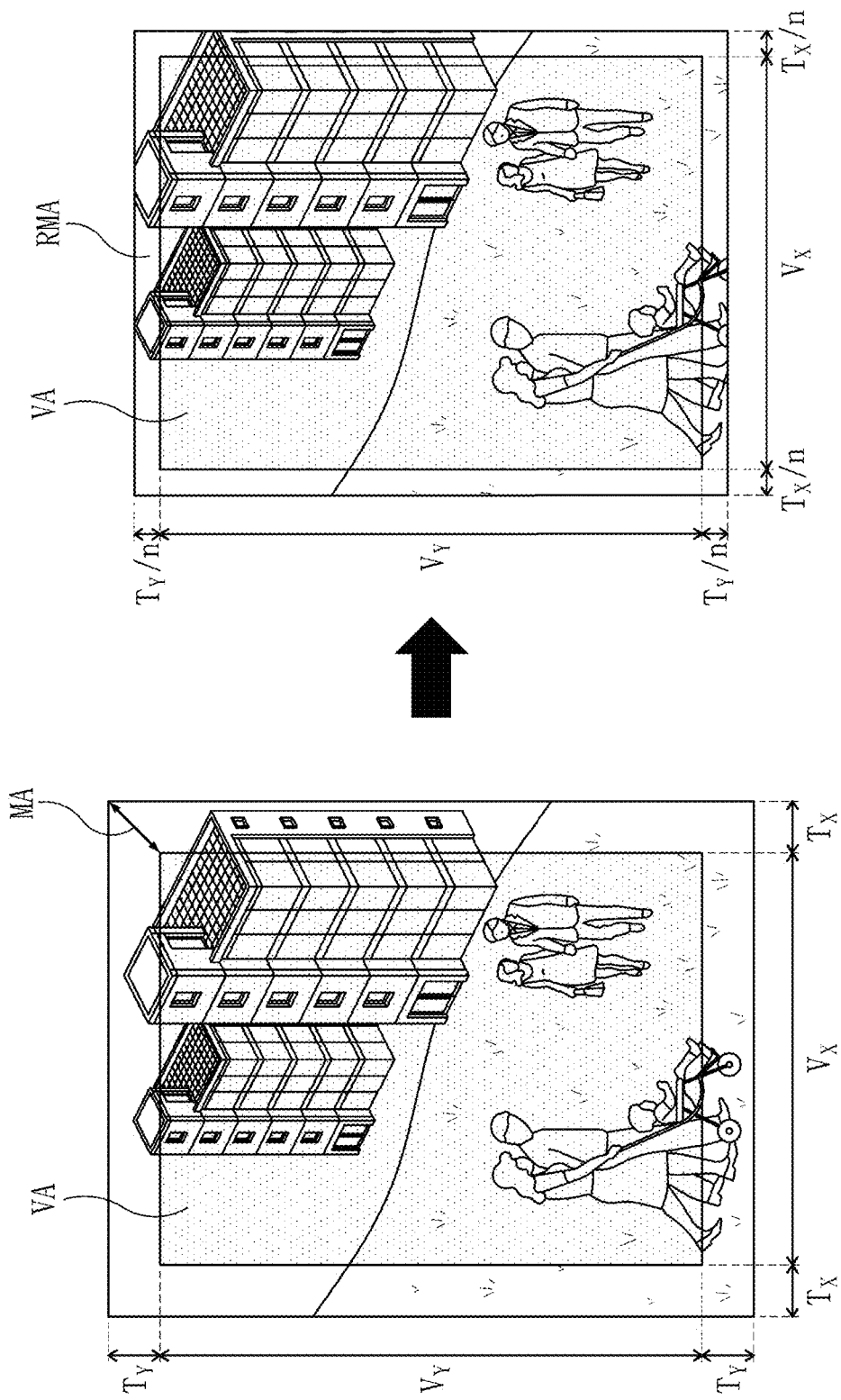

Next, at step S140, the encoding unit 130 generates a reduced margin area (RMA) by dividing the resolution of the margin area (MA) by a scaling factor, and then encodes the visual field area (VA) and the reduced margin area (RMA) to generate a split virtual reality image including the encoded visual field area (VA) and the encoded reduced margin area (RMA). For example, as shown in FIG. 8, the reduced margin area (RMA) may be generated by dividing the resolution of the margin area (MA) by a scale factor n (Tx/n, Ty/n). Accordingly, the image quality is reduced, so that the size of the split virtual reality image can be reduced.

Figure 9:
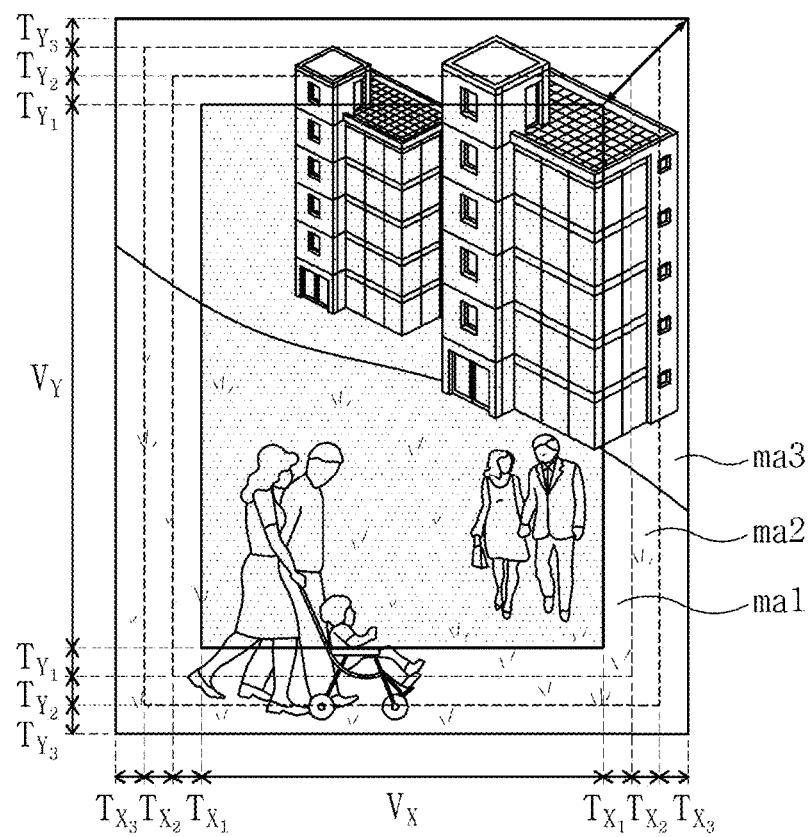

According to another embodiment, when encoding the rendered image, the encoding unit 130 may apply a gradation to the margin area. A detailed description is as follows. As described above, according to an embodiment, the margin area (MA) is an area extending outward from the edges of the visual field area (VA). According to another embodiment, the margin area (MA) may be divided into a plurality of sections. The scale factor of each of the plurality of sections has a relatively large value as the distance from the visual field area (VA) increases. Therefore, each of the plurality of sections within the margin area (MA) may be reduced using the scale factor having a gradation to generate the reduced margin area (RMA). For example, as shown in FIG. 9, the margin area (MA) may be divided into a first section (ma1), a second section (ma2), and a third section (ma3). Also, the scale factors n1, n2, and n3 respectively corresponding to the first section (ma1), the second section (ma2), and the third section (ma3) may be set to have relatively large values (n1<n2<n3) as they are away from the visual field area (VA). Therefore, the reduced margin area (RMA) may be generated such as (Tx1/n1, Ty1/n1), (Tx2/n2, Ty2/n2), and (Tx3/n3, Ty3/n3). Through this, it is possible to generate a virtual reality image having a relatively wider area from the same resource. Also, if necessary, it is possible to generate a virtual reality image with a relatively smaller size. In particular, the embodiment with reference to FIG. 9 can provide an image with no significant degradation in image quality when the user of the virtual reality device 20 moves relatively small.

Next, at step S150, the streaming transmission unit 140 muxes a common media application format (CMAF) live profile to the previously encoded split virtual reality image, and transmits the split virtual reality image including the CMAF live profile to the virtual reality device 20. At this time, after split-encoding the split virtual reality image in units of chunks according to the CMAF, the streaming transmission unit 140 may transmit the split virtual reality image in units of chunks.

Upon receiving the split virtual reality image including the CMAF live profile, the streaming reception unit 220 of the virtual reality device 20 derives the split virtual reality image by demuxing (or demultiplexing) the CMAF live profile from the received split virtual reality image.

Then, at step S180, the decoding unit 230 decodes the reduced margin area (RMA) according to the visual field area (VA) corresponding to the visual field (VF) and the scaling factor based on the rotation center (RC), and inversely enlarges the reduced margin area (RMA) to derive the split virtual reality image including the visual field area (VA) and the margin area (MA). Then, the derived split virtual reality image including the visual field area (VA) and the margin area (MA) is stored in the decoding buffer (DB) of the storage unit 26.

For example, as shown in FIG. 10, when the width and height of the visual field area (VA) are Vx and Vy, and when the width and height of the margin area (MA) are 2Tx and 2Ty, the decoding unit 230 decodes the visual field area (VA) corresponding to the visual field (VF) and the reduced margin area (RMA), like "Tx/n, Ty/n", reduced according to the scaling factor n, and inversely enlarges the reduced margin area (RMA) reduced according to the scaling factor to derive the split virtual reality image including the visual field area (VA) and the margin area (MA). Then, the decoding buffer (DB) stores the split virtual reality image which is set to a size of (Vx+2Tx)×(Vy+2Ty) in consideration of both the visual field area (VA) and the margin area (MA).

Similarly, in the case that the reduced margin area (RMA) is generated according to another embodiment of the present disclosure by reducing each of the plurality of sections within the margin area (MA) by using a scale factor having a gradation, it is possible to derive the split virtual reality image by inversely enlarging the reduced margin area according to the scaling factor.

Figure 11A:
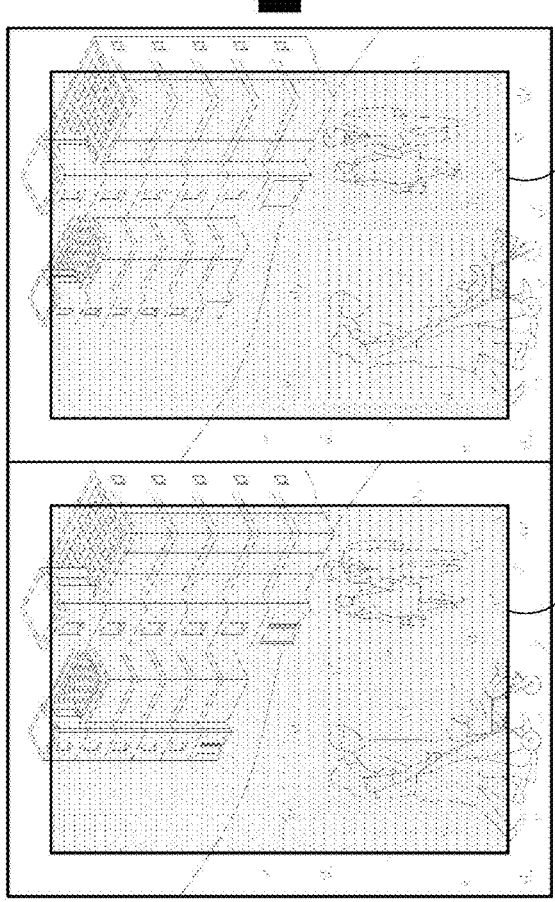
Figure 11B:
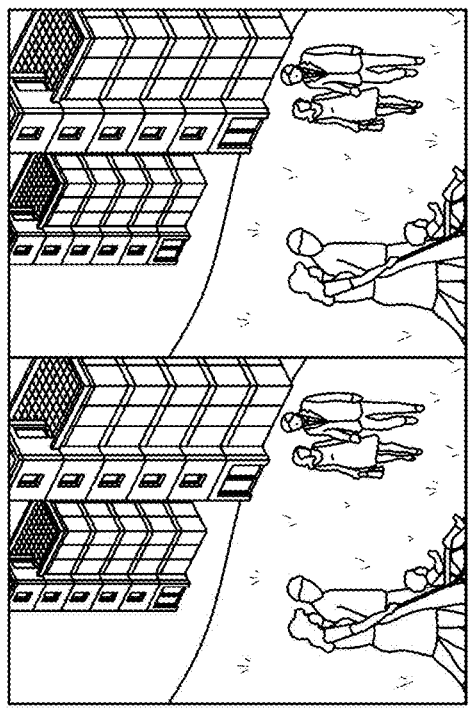
Figure 11C:
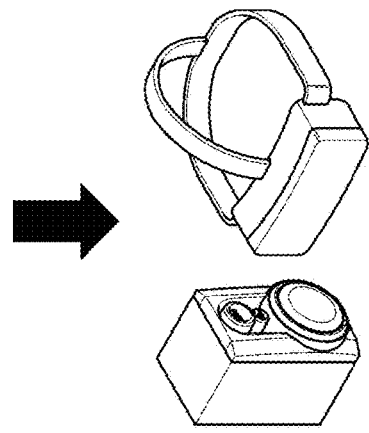

Next, at step S190, the reproduction unit 240 reproduces the split virtual reality image. Referring to FIGS. 11A-11C, the reproduction unit 240 derives the user's rotation center (RC) at the reproduction time point through the sensor unit 22. Then, from the split virtual reality image stored in the decoding buffer (DB), for example, as shown in FIG. 11A, the reproduction unit 240 derives a reproduction area through a view window (VW) corresponding to the visual field (VF) based on the user's rotation center (RC) at the reproduction time point, for example, as shown in FIG. 11B. Such a reproduction area may be stored in the rendering buffer (RF). Subsequently, as shown in FIG. 11C, the reproduction unit 240 renders and reproduces the derived reproduction area.

Figure 12A:
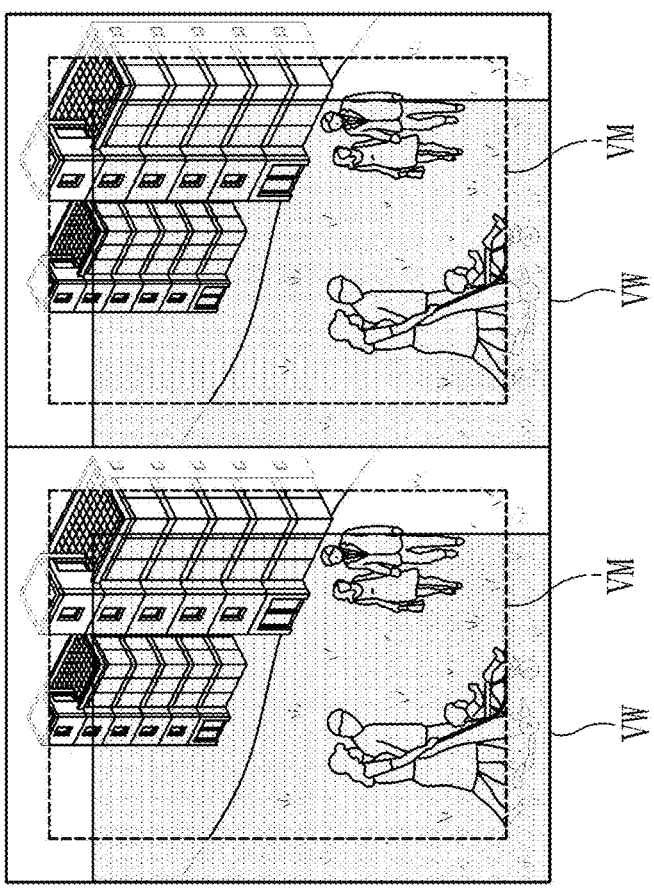
Figure 12B:
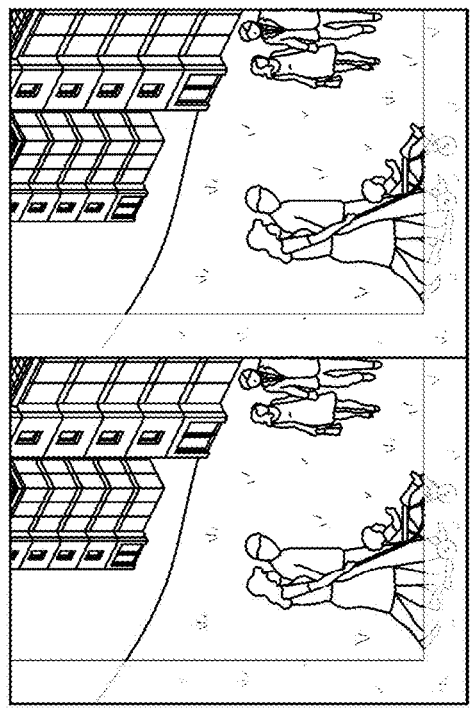
Figure 12C:
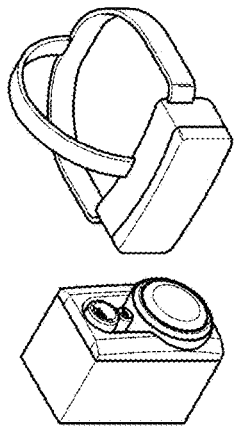

In the case that the user's field of vision moves before the next frame of the split virtual reality image is received, the view window (VW) is moved to render the corresponding area. If the view window (VW) deviates from the visual field area (VA) due to the user's movement as shown in FIG. 12A, a portion of the reproduction area may have a relatively low resolution because it is the margin area (MA) as shown in FIG. 12B. Therefore, during reproduction as shown in FIG. 12C, the user enjoys the reproduction area containing the low resolution portion until the split virtual reality image of the next frame is received and decoded.

The method according to embodiments of the present disclosure may be provided in the form of a non-transitory computer-readable recording medium suitable for storing computer program instructions and data. The computer-readable recording medium may include program instructions, data files, data structures, etc. alone or in combination, and includes all kinds of recording devices in which data that can be read by a computer system is stored. The computer-readable recording medium includes a hardware device specially configured to store and execute program instructions, including magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), and a flash memory. Further, the computer-readable recording medium may be distributed over networked computer systems so that computer-readable code can be stored and executed in a distributed fashion. In addition, functional programs, associated codes, and code segments for implementing the present disclosure may be easily deduced or altered by programmers in the art to which the present disclosure belongs.

Families and caregivers complain of difficulties for constant care of mentally ill people with severe emotional ups and downs or the elderly living alone. However, even in a home environment, the present disclosure can support continuous care through sympathetic dialogue with people with mental disorders, such as panic disorder, depression, and schizophrenia, who require continuous observation and monitoring. Furthermore, according to the present disclosure, a guardian can be notified of an emergency situation of a patient even from a distance, and it is possible to monitor and deliver the patient's condition outside the hospital to medical staff 24 hours a day, so that it is possible to accurately identify the patient's condition.

Although embodiments of the present disclosure are described above, these embodiments are exemplary only and not construed as a limitation. Various changes and modifications to the present disclosure and their equivalents can be made as well understood by those skilled in the art without departing from the technical subject matter of the present disclosure and the scope of appended claims.

What is claimed is:

1. An edge server for providing a virtual reality (VR) image, comprising:
   a rendering synchronization processor configured to receive inertial information including a rotation center of a virtual reality device from the virtual reality device, derive a visual field and a margin of the virtual reality device based on the inertial information, and send the visual field and the margin to the virtual reality device, such that the edge server and the virtual reality device synchronize the visual field and the margin;
   a rendering processor configured to generate a rendered image by rendering a visual field area corresponding to the visual field and a margin area corresponding to the margin based on the rotation center in an entire virtual reality image, the margin area surrounding the visual field area;
   an encoder configured to generate a reduced margin area by dividing a resolution of the margin area by a scaling factor, and encode the visual field area and the reduced margin area to generate a split virtual reality image including the encoded visual field area and the encoded reduced margin area; and a streaming transmitter configured to transmit the split virtual reality image to the virtual reality device.

2. The edge server of claim 1, wherein the margin area is divided into a plurality of sections, and wherein the scale factor of each of the plurality of sections has a relatively large value as a distance from the visual field area increases.

3. The edge server of claim 1, wherein the streaming transmitter is configured to multiplex a common media application format (CMAF) live profile to the split virtual reality image, and split-encode the split virtual reality image in units of chunks according to the CMAF to transmit the split virtual reality image.

4. The edge server of claim 1, wherein the margin area comprises a first margin area section surrounding the visual field area and a second margin area section surrounding the visual field area and the first margin area section, and wherein the second margin area section has a scale factor greater than that of the first margin area section.

5. A virtual reality device for providing a virtual reality (VR) image, comprising:

a sensor;

a reproduction synchronization processor configured to derive inertial information including a rotation center of a virtual reality device through the sensor, transmit the inertial information including the rotation center of the virtual reality device to an edge server, and receive a visual field and a margin derived based on the inertial information from the virtual reality device, such that the edge server and the virtual reality device synchronize the visual field and the margin;

a decoder configured to decode a visual field area and a reduced margin area according to the visual field and the margin upon receiving a split virtual reality image from the edge server, and enlarge the reduced margin area according to a scaling factor to derive the split virtual reality image including the visual field area and the margin area, the reduced margin area surrounding the visual field area; and a reproduction processor configured to reproduce the derived split virtual reality image.

6. The virtual reality device of claim 5, wherein the decoder is configured to store the split virtual reality image including the visual field area and the margin area in a decoding buffer, and the reproduction processor is configured to derive a reproduction area through a view window from the split virtual reality image stored in the buffer, and reproduce the derived reproduction area.

7. The virtual reality device of claim 5, wherein the margin area is divided into a plurality of sections, and wherein the scale factor of each of the plurality of sections has a relatively large value as a distance from the visual field area increases.

8. The virtual reality device of claim 5, wherein the margin area comprises a first margin area section surrounding the visual field area and a second margin area section surrounding the visual field area and the first margin area section, and wherein the second margin area section has a scale factor greater than that of the first margin area section.

9. A method for providing a virtual reality (VR) image at an edge server, comprising:

receiving, at a rendering synchronization processor, inertial information including a rotation center of a virtual reality device from the virtual reality device;

deriving, at the rendering synchronization processor, a visual field and a margin of the virtual reality device based on the inertial information;

sending, at the rendering synchronization processor, the visual field and the margin to the virtual reality device, such that the edge server and the virtual reality device synchronize the visual field and the margin;

generating, at a rendering processor, a rendered image by rendering a visual field area corresponding to the visual field and a margin area corresponding to the margin based on the rotation center in an entire virtual reality image, the margin area surrounding the visual field area;

generating, at an encoder, a reduced margin area by dividing a resolution of the margin area by a scaling factor, and encoding the visual field area and the reduced margin area to generate a split virtual reality image including the encoded visual field area and the encoded reduced margin area; and transmitting, at a streaming transmitter, the split virtual reality image to the virtual reality device.

10. The method of claim 9, wherein the margin area comprises a first margin area section surrounding the visual field area and a second margin area section surrounding the visual field area and the first margin area section, and wherein the second margin area section has a scale factor greater than that of the first margin area section.

11. A method for providing a virtual reality (VR) image at a virtual reality device, comprising:

deriving, at a reproduction synchronization processor, inertial information including a rotation center of a virtual reality device through a sensor;

transmitting, at a reproduction synchronization processor, the inertial information including the rotation center of the virtual reality device to an edge server;

receiving, at the reproduction synchronization processor, a visual field and a margin derived based on the inertial information from the virtual reality device, such that the edge server and the virtual reality device synchronize the visual field and the margin;

decoding, at a decoder, a visual field area and a reduced margin area according to the visual field and the margin upon receiving a split virtual reality image from the edge server, and enlarging the reduced margin area according to a scaling factor to derive the split virtual reality image including the visual field area and the margin area surrounding the visual field area; and reproducing, at a reproduction processor, the derived split virtual reality image.

12. The method of claim 11, wherein the margin area comprises a first margin area section surrounding the visual field area and a second margin area section surrounding the visual field area and the first margin area section, and wherein the second margin area section has a scale factor greater than that of the first margin area section.

* * * * *